(12) United States Patent
Sakamoto et al.

(10) Patent No.: US 11,343,320 B2
(45) Date of Patent: May 24, 2022

(54) INFORMATION PROCESSING APPARATUS, ACCESS CONTROL SYSTEM, AND NON-TRANSITORY COMPUTER-READABLE STORAGE MEDIUM FOR STORING ACCESS CONTROL PROGRAM

(71) Applicant: FUJITSU LIMITED, Kawasaki (JP)

(72) Inventors: Takuya Sakamoto, Kawasaki (JP); Riichiro Take, Setagaya (JP); Kazuaki Nimura, Kawasaki (JP); Hidenobu Ito, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/945,963

(22) Filed: Aug. 3, 2020

(65) Prior Publication Data

US 2021/0044657 A1 Feb. 11, 2021

(30) Foreign Application Priority Data

Aug. 5, 2019 (JP) .............................. JP2019-143650

(51) Int. Cl.
*H04L 67/51* (2022.01)
*H04L 67/125* (2022.01)
*G16Y 40/30* (2020.01)

(52) U.S. Cl.
CPC ............ *H04L 67/125* (2013.01); *G16Y 40/30* (2020.01); *H04L 67/16* (2013.01)

(58) Field of Classification Search
CPC ........ H04L 67/16; H04L 67/125; G16Y 40/30
See application file for complete search history.

(56) References Cited

U.S. PATENT DOCUMENTS

| 9,043,455 | B1* | 5/2015 | Kashanian | ............ H04W 8/245 709/224 |
| 2015/0128113 | A1* | 5/2015 | Skoglund | .................. G06F 8/54 717/140 |
| 2018/0322311 | A1* | 11/2018 | Kobayashi | .............. H04L 51/22 |
| 2019/0197803 | A1 | 6/2019 | Sakamoto et al. | |

FOREIGN PATENT DOCUMENTS

| JP | 2004-32220 A | 1/2004 |
| JP | 2007-4579 A | 1/2007 |
| JP | 2019-113981 A | 7/2019 |
| WO | 2006/040991 A1 | 4/2006 |

* cited by examiner

*Primary Examiner* — Jason D Recek
(74) *Attorney, Agent, or Firm* — Fujitsu Patent Center

(57) ABSTRACT

An information processing apparatus configured to provide an application programming interface (API) group for controlling a device coupled via a network, the information processing apparatus includes: a memory; and a processor coupled to the memory, the processor being configured to execute a receiving process that includes receiving data on any API of the API group from a terminal, execute a code execution process that includes executing first code indicating processing to be executed by the information processing apparatus, the first code being included in the data, thereby causing an API specified in the first code, of the API group, to be invocable from the terminal, and execute a control process that includes, in response to an invocation request for the API specified in the first code, the invocation request being transmitted from the terminal, performing control in accordance with the API over the device.

9 Claims, 10 Drawing Sheets

FIG. 6

```
{
  "header":{
    "url": "http://service1.fff.com/service1",
    "metadata":
    "begindate":"2017-10-23T15:00:00",
    "enddate":"2017-10-23T16:00:00",
    "description":"LED controller"
  },
  "payload":{
    "server":
    "FAy0nhtSFrZoqQ/nC9hoO8jKqLhqIzBQsFsv1Hph7P3MbvGwltgN0Ll4DaA3NBx3yvS63NPo1
    ccaXYl4VjuYovce6YxGzHufTp+xShvm/qcprvQs6nY5nsEQ95oFEUw/CyJCxCDGC8TO4dV44
    5AfnQ...(OMISSION)...",
    "client":
    "PCFET0NUWVBFIGh0bWw+DQo8aHRtbD4NCjxoZWFkPg0KICA8bWV0YSBjaGFyc2V0PSJ1
    dGYtOCIvPg0KICA8c2NyaXB0IHR5cGU9InRleHQvamF2YXNjcmlwdCIgc3JjPSJpSJyZXF1aXJlLm
    pzIj48L3NjcmlwdD4NCiAgPHNjcmlwdD4NCiAgPHNjcmlwdD4NCiAgPHNjcmlwdD4NCiAgPHNjcmlwdD4NCiAgPHNjcmlwdD4NCiAgPGxpbmsgcmVsPSJzdHlsZXNoZWV0Ii
    ew...(OMISSION)..."
  }
}
``` h1, p1, p1s, p1c

FIG. 7

```
WoT.produce(name:"LED12345678").then((thing) => {     ~d11
  thing.addProperty(name:"ledRed" , writable: true, valueDescription : "type":"number"});  ~d12
  thing.setPropertyWriteHandler("ledRed", (name, value) => {
    return new Promise((resolve, reject)=> {
      LED.changeRed(value);    ~d13
      resolve();
    });
  });
  thing.addProperty(name:"ledGreen", writable: true, valueDescription : "type":"number"});   ~d14
  thing.setPropertyWriteHandler("ledGreen", (name, value) => {
    return new Promise((resolve, reject) => {      ~d15
      LED.changeGreen(value);
      resolve();
    });
  });
  (OMISSION)
  thing.start();
  setTimeout(() => {                ~d16
    thing.stop();
    process.exit(1);
  }, 10000);
});
```

FIG. 8

```
<!DOCTYPE html>
<html>
<head>
<script>
window.onload = function() {
    let td = {                                                              ~d21
        "name":"LED12345678",
        "interaction":[
            {"name":"ledRed","schema":{"type":"number"},"writable":true,"observable":true,
             "@type":["Property"],
             "form":[{"href":"http://service1.fff.com/service1/LED12345678/ledRed",
                      "mediaType":"application/json"}]},
            {"name":"ledGreen","schema":{"type":"number"},"writable":true,"observable":true,
             "@type":["Property"],
             "form":[{"href":"http://service1.fff.com/service1/LED12345678/ledGreen",
                      "mediaType":"application/json"}]},
(OMISSION)
    ]
    let thing = WoT.consume(td);
    const redBtn = document.getElementById('redBtn');
    const greenBtn = document.getElementById('greenBtn');
(OMISSION)
    redBtn.addEventListener('click', () =>
        thing.invokeAction("ledRed", redText.value);            ~d22
    );
    greenBtn.addEventListener('click', () =>
        thing.invokeAction("ledGreen", greenText.value);        ~d23
    );
(OMISSION)
```

FIG. 10

```
{
  "name":"LED12345678",
  "interaction":[
    {"name":"ledRed","schema":{"type":"number"},"writable":true,"observable":true,
      "@type":["Property"],
      "form":[{"href":"http://service1.fujitsu.com/service1/LED12345678/ledRed",
      "mediaType":"application/json"}]},         ~d31

{"name":"ledGreen","schema":{"type":"number"},"writable":true,"observable":true,
      "@type":["Property"],
      "form":[{"href":"http://service1.fujitsu.com/service1/LED12345678/ledGreen",
      "mediaType":"application/json"}]},         ~d32
  ]
}
```

INFORMATION PROCESSING APPARATUS, ACCESS CONTROL SYSTEM, AND NON-TRANSITORY COMPUTER-READABLE STORAGE MEDIUM FOR STORING ACCESS CONTROL PROGRAM

CROSS-REFERENCE TO RELATED APPLICATION

This application is based upon and claims the benefit of priority of the prior Japanese Patent Application No. 2019-143650, filed on Aug. 5, 2019, the entire contents of which are incorporated herein by reference.

FIELD

The embodiments discussed herein are related to an information processing apparatus, an access control system, and a non-transitory computer-readable storage medium for storing an access control program.

BACKGROUND

A movement called Internet of Things (IoT) has emerged, and thus various devices are coupled to a network and are controlled remotely. There is another movement called shared economy. Thus, services of renting goods owned by an individual to many and unspecified persons (such as shared cars and a vacation rental) are widely used. To use an IoT device in a shared manner, access control is to be performed such that each time the device is used, a person who has no authority is restricted from using the device.

Examples of the related art include International Publication Pamphlet No. WO 2006/040991, Japanese Laid-open Patent Publication No. 2004-32220, and Japanese Laid-open Patent Publication No, 2007-4579.

SUMMARY

According to an aspect of the embodiments, provided is an information processing apparatus configured to provide an application programming interface (API) group for controlling a device coupled via a network. In an example, the information processing apparatus includes: a memory; and a processor coupled to the memory, the processor being configured to execute a receiving process that includes receiving data on any API of the API group from a terminal, execute a code execution process that includes executing first code indicating processing to be executed by the information processing apparatus, the first code being included in the data, thereby causing an API specified in the first code, of the API group, to be invocable from the terminal, and execute a control process that includes, in response to an invocation request for the API specified in the first code, the invocation request being transmitted from the terminal, performing control in accordance with the API over the device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a configuration of a ticket;

FIG. 7 illustrates an example of server code;

FIG. 8 illustrates an example of client code;

FIG. 10 illustrates an example of API information.

DESCRIPTION OF EMBODIMENT(S)

Therefore, it is conceivable to perform access control for an application programming interface (API) for controlling IoT devices, which is provided by a provider of services for control of IoT devices. This way is considered effective, for example, when the granularity of control is large (a few types of control), such as locking or unlocking of an IoT device, as a key of a house lent for a vacation rental, and lighting on or off of an IoT device used as a light bulb.

Otherwise, for example, there may be cases where it is desired to allow a plurality of types of control (fine-grained control) for IoT devices to be performed, such as cases where it is desired to allow the color adjustment (changing the value of each of red, green, and blue (RGB)) for a light bulb to be controlled. Specific examples of such control include, for color of a light bulb, adding +N or −N (N is between 1 and 255) to the value of any one of RGB, and setting the value of any one of RGB to any number from 0 to 255.

In such a case, when fine-grained access control (for example, access control in which some user may change the values of R and G and another user may change the value of B) is performed in accordance with the granularity of control, the management mechanism of the access control will be complicated.

Therefore, in one aspect, the present invention is directed to making the granularity of access control finer for devices that are controllable via a network.

Figure 1:
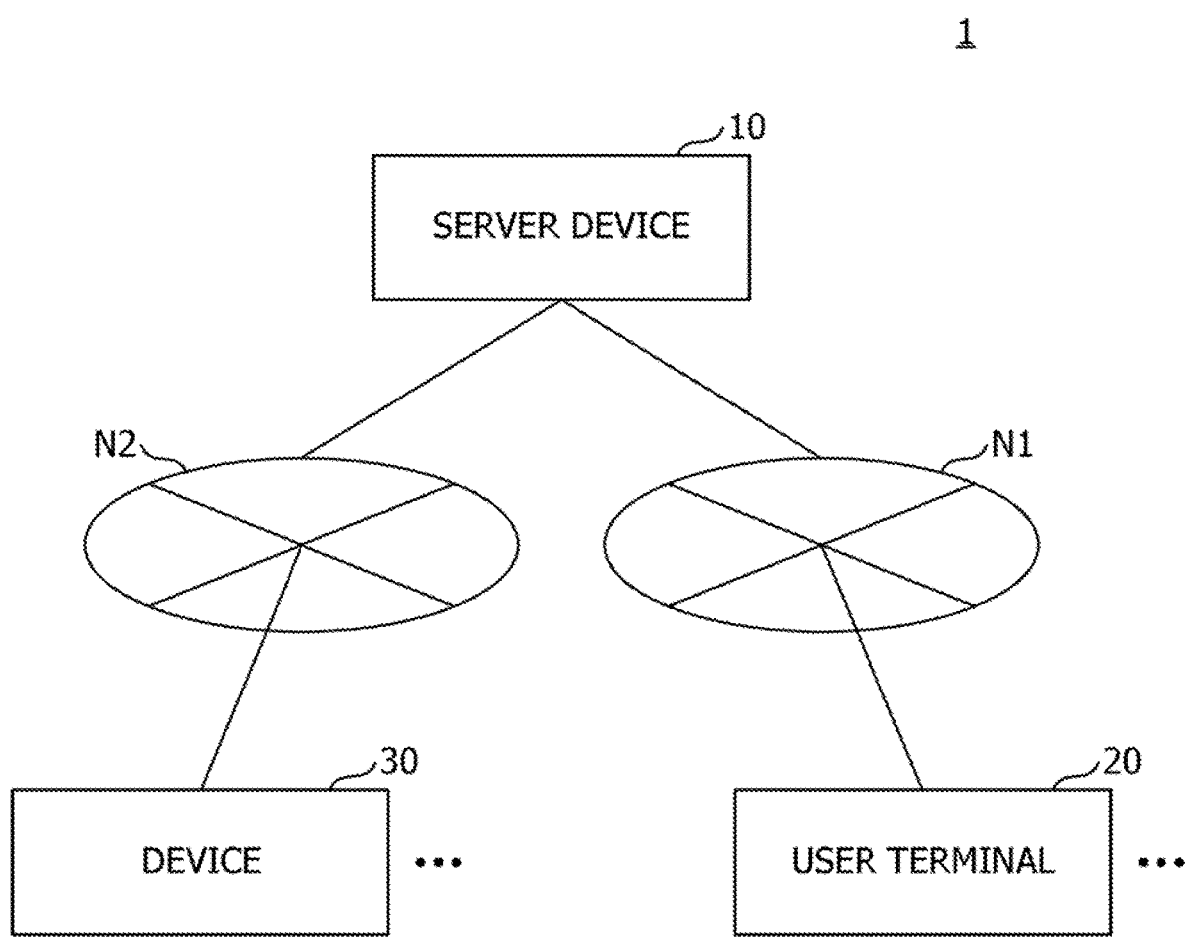
FIG. 1 illustrates an example of a configuration of an access control system in a first embodiment.

Embodiments of the present invention will be described below with reference to the drawings. FIG. 1 illustrates an example of a configuration of an access control system in a first embodiment. In FIG. 1, an access control system 1 includes a server device 10, one or more user terminals 20, and one or more devices 30. The server device 10 and each user terminal 20 are coupled via a network N1. The server device 10 and each device 30 are coupled via a network N2. The network N1 and the network N2 are, for example, the Internet, local area networks (LANs), near-field communication, or the like. The network N1 and the network N2 may be a common network.

The server device 10 is one or more computers that broker access of the user terminal 20 to the device 30. For example, the server device 10 publishes WebAPIs (hereafter simply referred to as APIs) for controlling the devices 30 in the network N1. However, each API is not at any time accessible. When the server device 10 receives a ticket from the user terminal 20, APIs to be accessed that are defined in the ticket are opened and become accessible. When any API opened based on the ticket is accessed, the server device 10 performs control in accordance with the API for the device 30 corresponding to the ticket. The ticket is data for imposing a restriction on an API that is accessible to (invocable from) the user terminal 20 (user), of an API group (an API group for controlling the devices 30) that may be published by the server device 10 via a network. The configuration of the ticket will be described in detail later.

The user terminal 20 is a terminal that is used by a user who remotely operates any device 30. Examples of the user terminal 20 include a personal computer (PC), a smartphone, and a tablet computer device. The user terminal 20 obtains a ticket for remotely operating the device 30 and transmits the ticket to the server device 10, thereby causing the server device 10 to perform desired control over the device 30. Although the server device 10 generates a ticket, the user terminal 20 is not limited to obtaining the ticket from the server device 10. For example, a user may obtain a ticket through a ticket broker and install (save) the ticket in the user terminal 20. By way of example, considering that the device 30 serving as a key of a room rent as a vacation rental is controlled by a ticket, the ticket may be obtained through a computer run by a real estate agent acting as a link between homeowners and renters. At this point, in accordance with a contract or the like between the real estate agent and the user, an API group or the like that is accessible (invocable) by using the ticket is determined, and the server device 10 generates a ticket that allows the API group to be accessed (a ticket that allows the API group to be invoked). Alternatively, if distribution of a ticket is permitted, the ticket may be transferred from some user to another user. For example, a ticket may be obtained in a way similar to that disclosed in Japanese Laid-open Patent Publication No. 2019-113981.

The device 30 is a device that may be controlled via the network N2. An IoT device may be used as the device 30. In the present embodiment, a light bulb that allows color (RGB) adjustment to be controlled via a network is described by way of example as the device 30. However, home appliances, motor vehicles, and other communication devices, for example, may be used as the devices 30.

Figure 2:
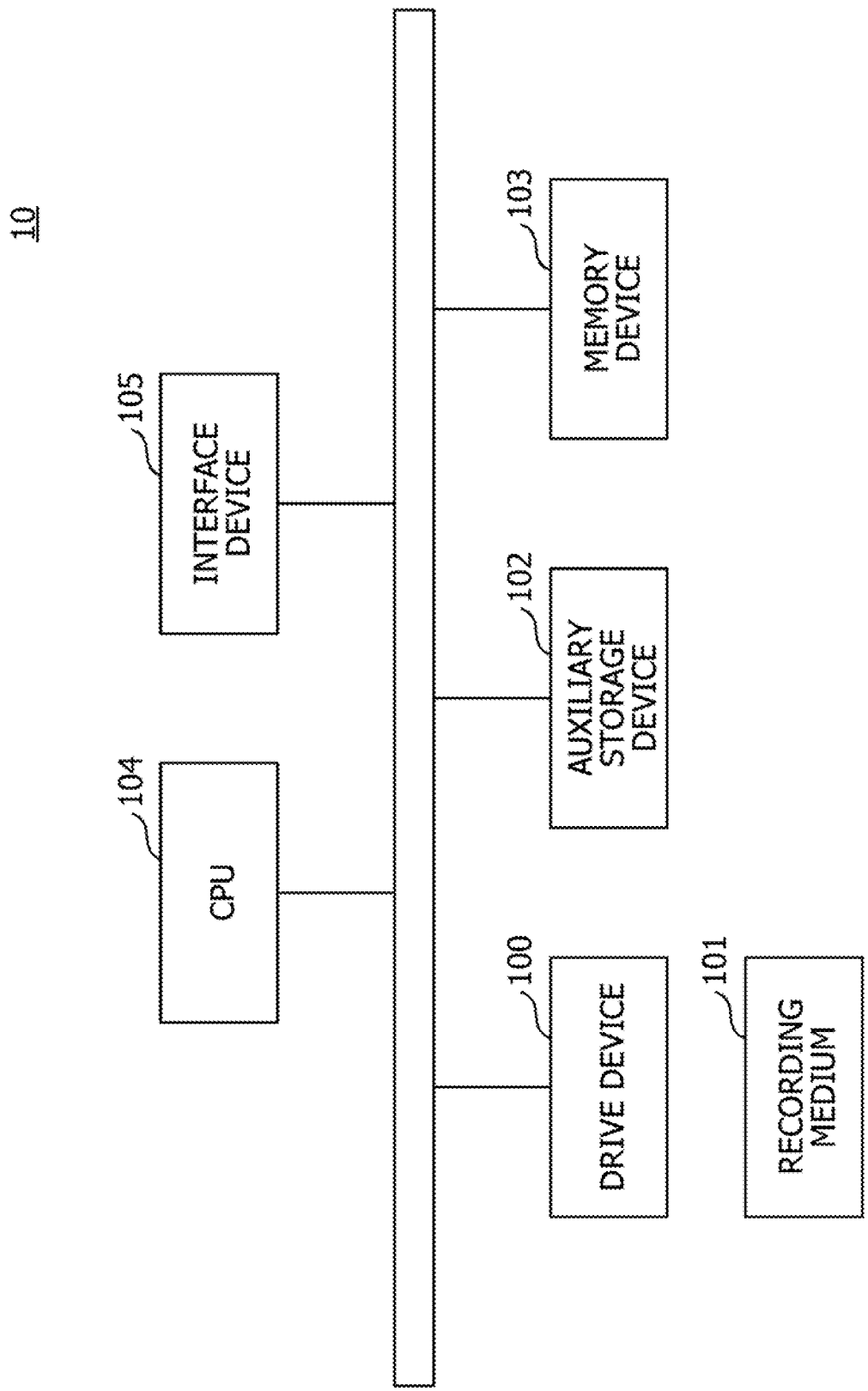
FIG. 2 illustrates an example of a hardware configuration of a server device 10 in the first embodiment.

FIG. 2 illustrates an example of a hardware configuration of the server device 10 in the first embodiment. The server device 10 in FIG. 2 includes a drive device 100, an auxiliary storage device 102, a memory device 103, a central processing unit (CPU) 104, and an interface device 105, for example, which are coupled to one another via a bus.

A program that implements processing on the server device 10 is provided by a recording medium 101. When the recording medium 101 on which the program is recorded is set in the drive device 100, the program is installed from the recording medium 101 into the auxiliary storage device 102 via the drive device 100. However, the program is not limited to being installed from the recording medium 101 but may be downloaded from another computer via a network. The auxiliary storage device 102 stores the installed program and also stores files, data, and the like to be used.

When an instruction to start a program is issued, the memory device 103 reads and stores the program from the auxiliary storage device 102. The CPU 104 performs functions related to the server device 10 according to the program stored in the memory device 103. The interface device 105 is used as an interface for coupling to a network.

Examples of the recording medium 101 include portable recording media, such as a compact disc read-only memory (CD-ROM), a digital versatile disc (DVD), and a Universal Serial Bus (USB) memory. Examples of the auxiliary storage device 102 include a hard disk drive (HDD) and a flash memory. Each of the recording medium 101 and the auxiliary storage device 102 corresponds to a computer-readable recording medium.

Figure 3:
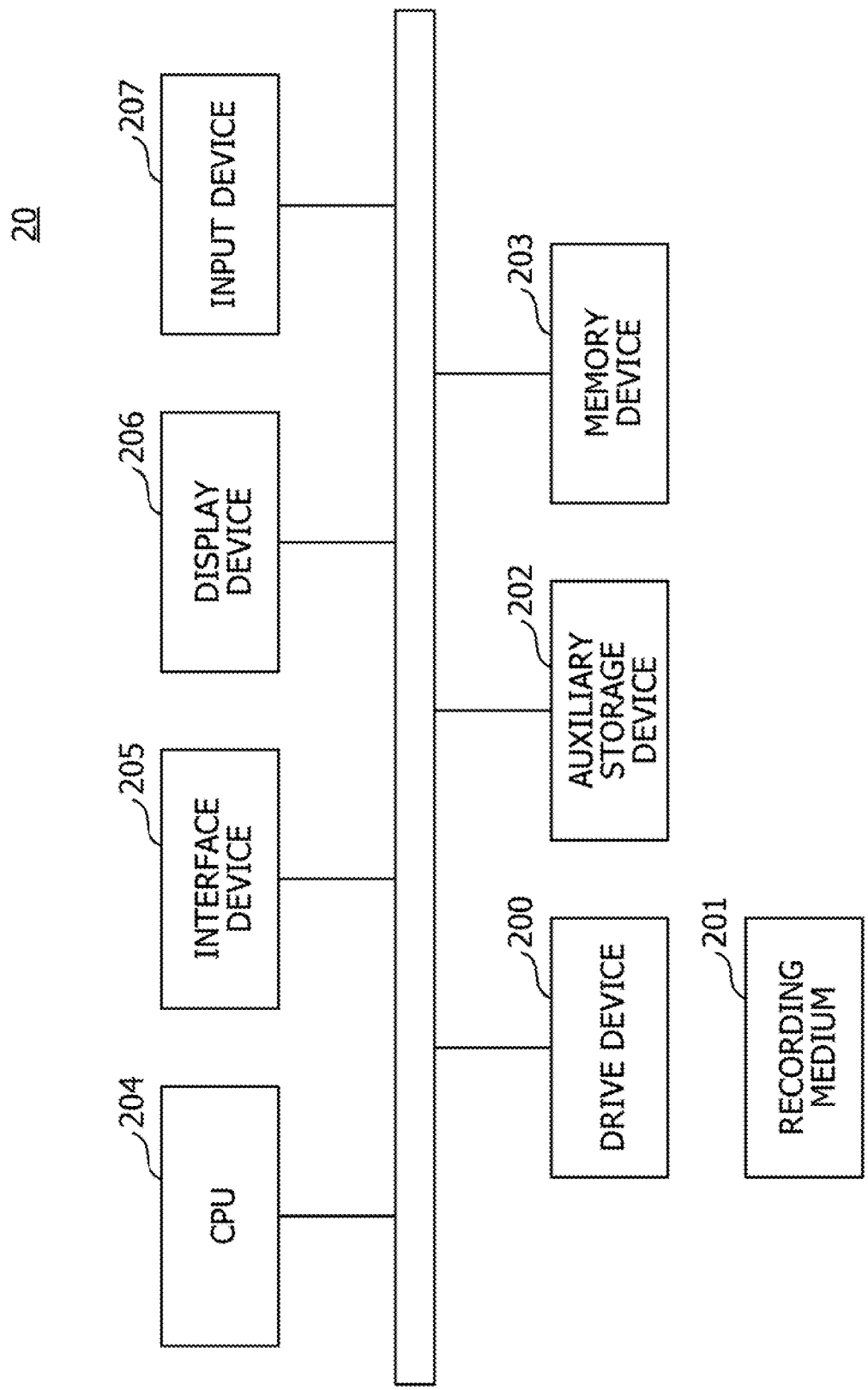
FIG. 3 illustrates an example of a hardware configuration of a user terminal 20 in the first embodiment.

FIG. 3 illustrates an example of a hardware configuration of the user terminal 20 in an embodiment of the present invention. The user terminal 20 in FIG. 3 includes a drive device 200, an auxiliary storage device 202, a memory device 203, a CPU 204, an interface device 205, a display device 206, and an input device 207, for example, which are coupled to one another via a bus B.

A program for implementing processing on the user terminal 20 is provided by a recording medium 201. When the recording medium 201 on which the program is recorded is set in the drive device 200, the program is installed from the recording medium 201 into the auxiliary storage device 202 via the drive device 200. However, the program is not limited to being installed from the recording medium 201 but may be downloaded from another computer via a network. The auxiliary storage device 202 stores the installed program and also stores files, data, and the like to be used.

When an instruction to start a program is issued, the memory device 203 reads and stores the program from the auxiliary storage device 202. The CPU 204 performs functions related to the user terminal 20 according to the program stored in the memory device 203. The interface device 205 is used as an interface for coupling to a network. The display device 206 displays a graphical user interface (GUI) and the like by means of a program. The input device 207, which is a keyboard, a mouse, buttons, a touch panel, or the like, is used for inputting various operation instructions.

Examples of the recording medium 201 include portable recording media, such as a CD-ROM, a DVD, a USB memory, and a secure digital (SD) card. Examples of the auxiliary storage device 202 include a HDD and a flash memory. Each of the recording medium 201 and the auxiliary storage device 202 corresponds to a computer-readable recording medium.

Figure 4:
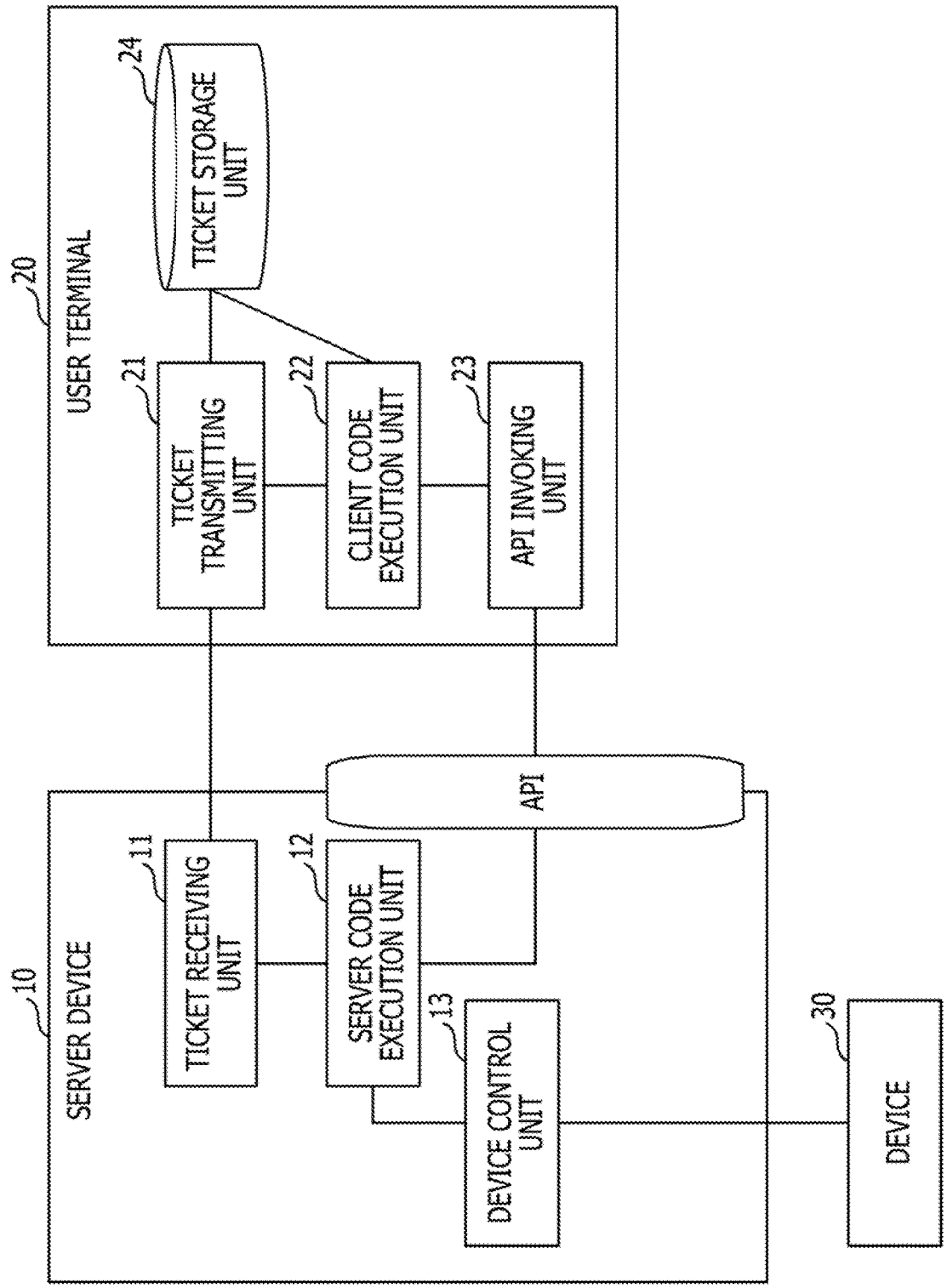
FIG. 4 illustrates an example of a functional configuration of the server device 10 and the user terminal 20 in the first embodiment.

FIG. 4 illustrates an example of a functional configuration of the server device 10 and the user terminal 20 in the first embodiment. In FIG. 4, the user terminal 20 includes a ticket transmitting unit 21, a client code execution unit 22, and an API invoking unit 23, for example. These units are implemented by processing that the CPU 204 is caused to execute by an application program installed in the user terminal 20. The application program is, for example, an application program corresponding to a service provided by the server device 10. For example, Hypertext Markup Language (HTML) and JavaScript (registered trademark) may be used to construct the application program. The user terminal 20 also includes a ticket storage unit 24. The ticket storage unit 24 may be, for example, implemented by using the auxiliary storage device 202 or the like.

The ticket transmitting unit 21, for example, transmits a ticket stored in the ticket storage unit 24 to the server device 10 at a timing in response to an operation or the like performed by a user. In the ticket storage unit 24, tickets obtained in advance by the user are stored. In the present embodiment, for convenience, it is assumed that one ticket is stored in the ticket storage unit 24. However, a plurality of tickets may be stored in the ticket storage unit 24. In this case, a ticket to be transmitted may be selected in accordance with an operation of a user, or the like.

The client code execution unit 22 interprets a portion (hereafter referred to as a "client portion") including programming code (hereafter referred to as "client code") to be executed by the user terminal 20, of information included in the ticket, and executes processing according to the client code. The client portion includes client code that specifies an API to which access is granted by the ticket.

The API invoking unit 23 invokes an API to which access is granted in the ticket. The API is supposed to be invoked as a result of processing according to the client code executed by the client code execution unit 22.

In contrast, the server device 10 includes a ticket receiving unit 11, a server code execution unit 12, and a device control unit 13, for example. These units are implemented by processing that the CPU 104 is caused to execute by one or more programs installed in the server device 10.

The ticket receiving unit 11 receives a ticket transmitted from the user terminal 20.

The server code execution unit 12 interprets a portion (hereafter referred to as a "server portion") including programming code (hereafter referred to as "server code") to be executed by the server device 10, of information included in the ticket received by the ticket receiving unit 11, and executes processing according to the server code. The server portion includes definitions for the opening of an API to which access is granted by the ticket, and for processing in response to invoking the API. The opening of an API refers to enabling the API. The enabling of an API refers to causing the API to be accessible (invocable). For example, enabling of an API may be achieved by opening a socket corresponding to the API or launching a thread corresponding to the API, for example.

In response to invoking the function (API) for controlling the device 30, which is invoked as a result of processing according to the server code executed by the server code execution unit 12, the device control unit 13 performs control corresponding to the invoked function over the device 30.

Figure 5:
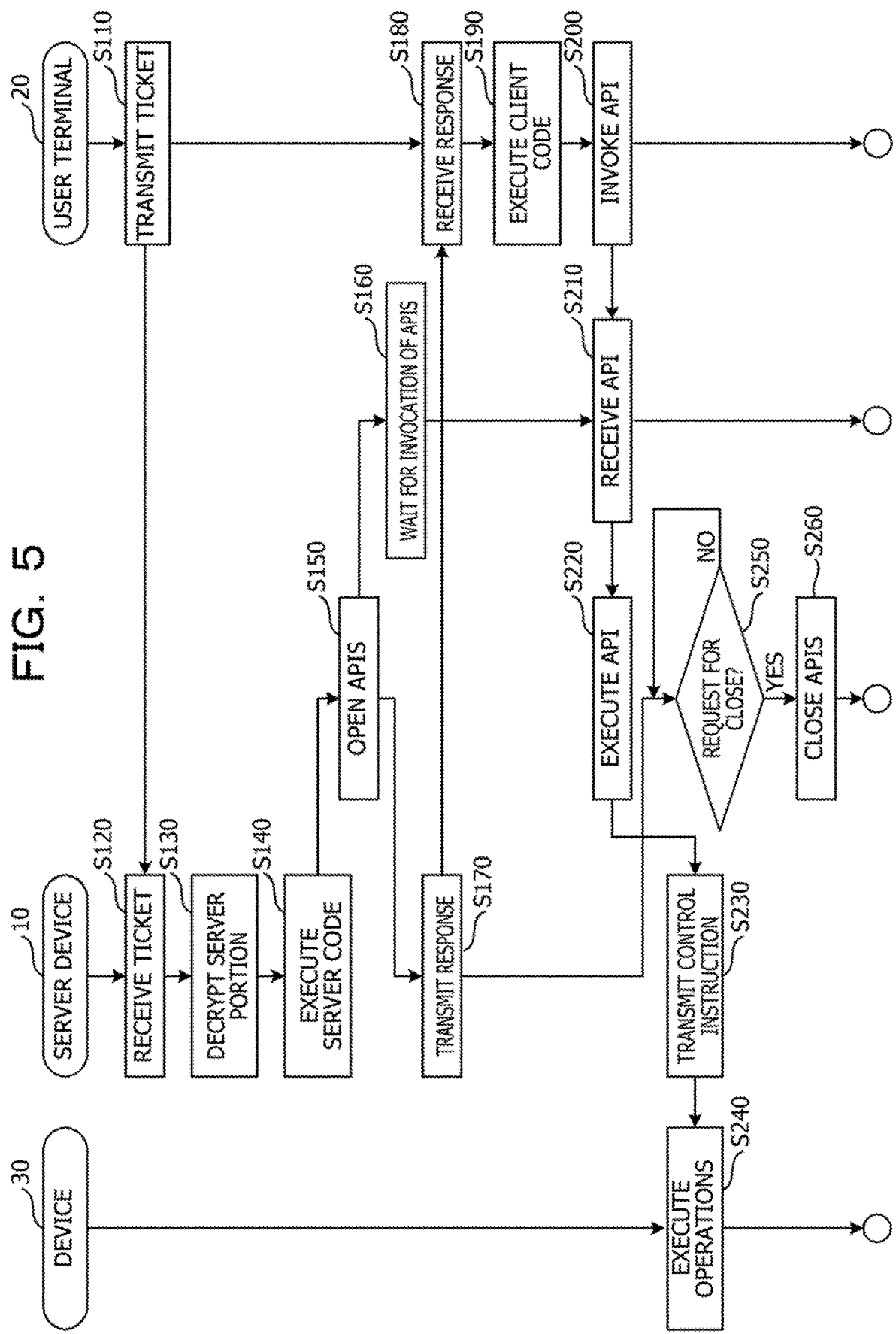
FIG. 5 is a diagram for explaining an example of a procedure of processing executed in an access control system in the first embodiment.

The procedure of processing executed in the access control system 1 will be described below. FIG. 5 is a diagram for explaining an example of a procedure of processing executed in an access control system in the first embodiment.

In step S110, in response to an operation of the user, for example, the ticket transmitting unit 21 of the user terminal 20 transmits a ticket stored in the ticket storage unit 24 to the transmission destination described in the ticket. Transmission of the ticket is performed safely by using Hypertext Transfer Protocol Secure (HTTPS), which is normally used for Web services.

FIG. 6 illustrates an example of a configuration of a ticket. The ticket illustrated in FIG. 6 is described in JavaScript (registered trademark) Object Notation (JSON) format. In FIG. 6, the ticket includes a header portion h1, which is the value of a header key, and a payload portion p1, which is the value of a payload key.

The header portion h1 includes a url key and its value, and a metadata key and its value. The value of the url key, "service1.fff.com/service1.", is the Uniform Resource Locator (URL) of the transmission destination of the ticket.

The value of the metadata key includes the expiration date (begindate, enddate) of the ticket and a description for the ticket ("description":"LED controller"), for example. The value of the metadata key (particularly the value of a description key) is information for display.

The payload portion p1 includes a server portion p1s, which is the value of a server key, and a client portion p1c, which is the value of a client key. The server portion p1s and the client portion p1c are encoded with base64. However, prior to being encoded, the server portion p1s is encrypted with an encryption key (hereafter referred to as a "server key") that is stored in the server device 10. Doing so may inhibit unauthorized overwriting of processing that the server device 10 executes.

In the present embodiment, a URL described as the value of the url key in the header portion h1 of the ticket corresponds to the server device 10. Accordingly, a ticket transmitted in step S110 (hereafter referred to as a "target ticket") is received by the ticket receiving unit 11 of the server device 10 (S120).

Subsequently, the server code execution unit 12 of the server device 10 decodes the server portion p1s of the payload portion p1 of the target ticket and decrypts the decoded server portion p1s using the server key, thereby obtaining server code (S130).

FIG. 7 illustrates an example of server code. In FIG. 7, an example is illustrated in which server code is described as a program using Scripting API (w3c.github.io/wot-scripting-api/) defined in Web of Things (WoT). Scripting API defines APIs discussed by WoT working group (WG) of the World Wide Web Consortium (W3C). The APIs enable programs of generating APIs for control of the device 30 and accessing the generated APIs to be described easily.

Subsequently, the server code execution unit 12 executes processing according to the decrypted server code (S140). At this timing, the server code execution unit 12 performs opening of two APIs by invoking addProperty of each of a description d12 and a description d14 (S150). For example, an API corresponding to "ledRed" included in the description d12 and an API corresponding to "ledGreen" included in the description d14 are opened. The APIs opened at this point are APIs to which access is granted to the user terminal 20 that is the transmission source of the target ticket.

Subsequently, the server code execution unit 12 associates the opened APIs with the respective URLs and waits for invocation of the APIs (S160). For example, the server code execution unit 12 associates an API corresponding to "ledRed" with "service1.fff.com/service1/LED12345678/ledRed", which is a URL in which a path name including "LED12345678", as the identification information of an LED light bulb included in the description d11, and "ledRed" are added to the URL (service1.fff.com/service1) of the server device 10. The server code execution unit 12 associates an API corresponding to "ledGreen" with "service1.fff.com/service1/LED12345678/ledGreen", which is a URL in which a path name including "LED12345678", as the identification information of the LED light bulb included in the description d11, and "ledGreen" are added to the URL (service1.fff.com/service1) of the server device 10.

Subsequently, the server code execution unit 12 transmits a response for the target ticket to the user terminal 20, which is the transmission source of the target ticket (S170).

When the ticket transmitting unit 21 of the user terminal 20 receives the response (S180), the client code execution unit 22 executes processing according to client code obtained by decoding the client portion p1c of the target ticket (S190).

FIG. 8 illustrates an example of client code. In FIG. 8, the client code is implemented in a form in which JavaScript is described in HTML. However, the form of client code is not limited to the predetermined form, provided that the form allows the client code execution unit 22 to interpret the client code.

A description d21 describes the association of the names (ledRed and ledGreen) of APIs, which are prepared in the server device 10 by using variable td, with the URLs (service1.fff.com/service1/LED12345678/ledRed, and service1.fff.com/service1/LED12345678/ledGreen). The URLs match URLs dynamically associated with the APIs by the server code execution unit 12 of the server device 10. For example, the server code execution unit 12 generates URLs for APIs to be opened so that the generated URLs match the respective URLs described in the client code. Dynamically generating URLs may make it difficult to estimate the URLs for APIs and may decrease the likelihood of unauthorized access to the APIs. The API whose name is "ledRed" is referred to as "RedAPI" hereafter, and the API whose name is "ledGreen" is referred to "GreenAPI" hereafter.

A description d22 describes a definition of invoking RedAPI (for example, "service1.fff.com/service1/LED12345678/ledRed") corresponding to the name of ledRed, as invokeAction, by specifying the value (0 to 255) input to a text box (redText) corresponding to red on a screen (hereafter referred to as an "application screen") displayed on the user terminal 20 by HTML as the client code.

A description d23 describes a definition of invoking GreenAPI (for example, "service1.fff.com/service1/LED12345678/ledGreen") corresponding to the name of ledGreen, as invokeAction, by specifying the value (0 to 255) input to a text box (greenText) corresponding to green on the application screen.

The description d21, the description d22, and the description d23, for example, are described based on the Scripting API of WoT, as is the case for the server code.

In step S190, processing in accordance with the description d21, and the description d22 or the description d23, for example, is executed. As a result, the API invoking unit 23 executes invocation of an API in accordance with the description d22 or the description d23 (S200). For example, the API invoking unit 23 transmits a request addressed to a URL corresponding to the API. In the request, the value (0 to 255) input to the text box on the application screen is also included.

When receiving the request (S210), the server code execution unit 12 of the server device 10 executes processing according to the definition of the API corresponding to an URL related to the request in the server code (S220). For example, if the URL is "service1.fff.com/service1/LED12345678/ledRed", the server code execution unit 12 invokes "LED.changeRed(value);" in the description d13 of the server code (FIG. 7). However, if the URL is "service1.fff.com/service1/LED12345678/ledGreen", the server code execution unit 12 invokes "LED.changeGreen(value);" in the description d15 of the server code (FIG. 7). The invocation of these functions corresponds to function invocation provided by the device control unit 13. For example, the function invocation corresponds to requesting the device control unit 13 to control the device 30. Execution of processing according to the definition of an API corresponding to a URL related to the request is achieved based on function invocation setting performed by setPropertyWriteHandler in the description d13 or the description d15. The value (0 to 255) included in the received request is substituted for the value of "LED.changeRed(value);" in the description d13 or "LED.changeGreen(value);" in the description d15.

In response to the function invocation, the device control unit 13 transmits a control instruction in accordance with the function to the device 30 (S230). For example, an instruction indicating that the value of R be 255, or the like, is transmitted. When receiving the control instruction, the device 30 performs operations according to the control instruction (S240). Although not illustrated in FIG. 5, as desired, a response including information indicating a result of operations performed by the device 30 may be transmitted from the server code execution unit 12 to the user terminal 20.

Steps S200 to S240 are, for example, repeated in response to operations on the application screen performed by a user. Then, when a request is made to close APIs (Yes in S250), the server code execution unit 12 closes all the APIs opened in step S150 (S260). Closing of an API refers to disabling an API. The disabling of an API refers to causing an API to be inaccessible. For example, the disabling of an API may be implemented by closing a socket corresponding to the API, stopping a thread corresponding to the API, or the like.

In the present embodiment, it is defined in the setTimeout function in the description d16 of the server code (FIG. 7) to invoke thing.stop( )10000 milliseconds after the opening of APIs to thereby invoke process.exit(1). The definition indicates that APIs are closed 10000 milliseconds after the opening of the APIs.

Accordingly, 10000 milliseconds after step S150, the server code execution unit 12 executes step S260 to close all the APIs opened in step S150. As a result, thereafter, even when an API is invoked from the user terminal 20 a request for invoking the API will not be received by the server code execution unit 12, For example, access to the API will be impractical.

In the present embodiment, an example is illustrated in which an elapsed time period after opening of APIs defines the timing at which the APIs are to be closed. However, a request for closing the APIs may be made by the user terminal 20. In this case, it is sufficient that the payload portion p1 of the ticket be defined so as to enable access of the user terminal 20 to an API (hereafter referred to as a "close API") indicating closing of APIs. For example, it is sufficient that the definition of processing of invoking the close API in response to any operation on the application screen performed by a user be described in the client code of the client portion p1c in the payload portion p1. In contrast, it is sufficient that the definition of processing of closing APIs in response to invoking the close API be described in the server code of the server portion p1s in the payload portion p1.

As described above, according to the first embodiment, code for temporarily opening APIs for controlling the device 30 is described in the payload portion p1 of the ticket, and the APIs are opened in response to execution of the code. Opening of the APIs enables the device 30 to be controlled through the APIs from the user terminal 20. For example, the APIs that may be accessed by the user terminal 20 are limited to APIs specified by code defined in the ticket. Accordingly, when fine-grained access control is desired, it is sufficient that a ticket that enables access in accordance with a desired granularity be defined without providing a special management mechanism in the server device 10. Thus, according to the present embodiment, the granularity of access control may be made finer for devices that are controllable via a network.

In response to receiving a ticket, the server device 10 opens APIs specified (requested to be opened) in the ticket, and closes the APIs after the elapse of a predetermined time period. Accordingly, since the time period in which each API may be accessed is limited, the likelihood of unauthorized access to the API may be decreased.

Although, in the above description, an example in which the APIs are WebAPIs is illustrated, the present embodiment may be applied to APIs in communication using Bluetooth (registered trademark) or a communication method with an integrated circuit (IC) card reader. In this case, APIs may be discriminated from each other by Bluetooth (registered trademark) addresses, identification (ID) of IC cards, or the like. In this case, for example, touching the user terminal 20 for the device 30 may make the device 30 controllable.

In the present embodiment, an example is illustrated in which, in response to receiving a ticket, APIs specified in the ticket are opened. However, for example, opening of APIs may be performed when another condition, such as payment of a usage fee, user authentication, or the like for the device 30 as a control target, is further satisfied.

A second embodiment will now be described. In the second embodiment, differences from the first embodiment are described. The points, for example, not described in the second embodiment may be substantially the same as those in the first embodiment.

Figure 9:
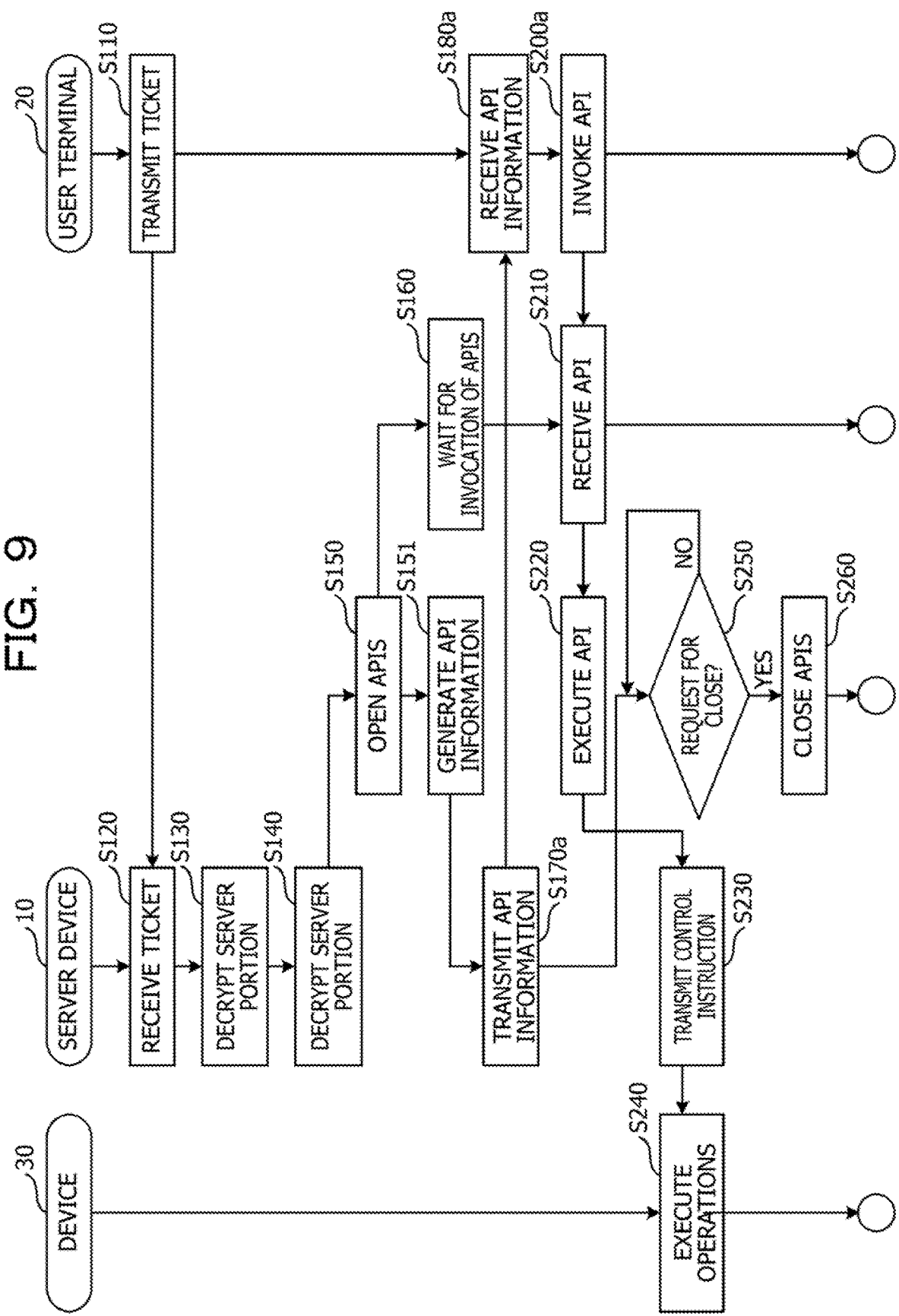
FIG. 9 is a diagram for explaining an example of a procedure of processing executed in an access control system in a second embodiment.

FIG. 9 is a diagram for explaining an example of a procedure of processing executed in an access control system in the second embodiment. In FIG. 9, the same steps as in FIG. 5 are denoted by the same step numbers, and the description thereof is omitted.

In the second embodiment, the server code execution unit 12 executes step S151 that follows step S150. In step S151, the server code execution unit 12 generates API information, which is used in the second embodiment instead of the client code of the client portion p1c, based on the header portion h1 and the server portion p1s of the target ticket, for example. In the second embodiment, the payload portion p1 of the target ticket is not limited to including the client portion p1c. However, the server portion p1s that is substantially the same as in the first embodiment is to be included in the payload portion p1 of the target ticket.

FIG. 10 illustrates an example of API information. In the API information, for each API that is accessible to (invocable from) the user terminal 20 (each API to which access is granted to the user terminal 20), information to be used for invoking the API (the information being referred to as "API invocation information" hereafter) is included. In each piece of the API invocation information, the name of the function of the API is associated with a URL corresponding to the API.

In FIG. 10, a description d31 is API invocation information of RedAPI (hereafter referred to as "RedAPI invocation information"). For example, in the description d31, it is defined that if the value of R (ledRed) is desired to be changed, "http://service1.fujitsu.com/service1/LED12345678/ledRed" is to be accessed. A description d32 is API invocation information of GreenAPI (hereafter referred to as "GreenAPI invocation information"). For example, in the description d32, it is defined that if the value of G (ledGreen) is desired to be changed, "http://service1.fujitsu.com/service1/LED12345678/ledGreen" is to be accessed.

The RedAPI invocation information may be generated based on the header portion h1 (FIG. 6) of the target ticket and the descriptions d11 and d12 (FIG. 7) corresponding to the server portion p1s of the target ticket, for example. The GreenAPI invocation information may be generated based on the header portion h1 (FIG. 6) of the target ticket and the descriptions d11 and d14 (FIG. 7) corresponding to the server portion p1s of the target ticket, for example.

Each piece of API invocation information included in the API information in FIG. 10 is described by reusing the format of Thing Description as defined in WoT and therefore has a high affinity for the user terminal 20 that is compliant with WoT. However, API invocation information may be described in another format, provided that the API invocation information is information in which the access destination is clearly specified for each API.

When the ticket transmitting unit 21 of the user terminal 20 receives the API information (S180a), the API invoking unit 23 interprets the API information. Based on the API invocation information included in the API information, the API invoking unit 23 transmits a request addressed to a URL corresponding to any API that the user terminal 20 may access (S200a). An API to be invoked may be selectable by a user on a user interface such as an application screen.

The subsequent steps are substantially the same as in the first embodiment.

As described above, according to the second embodiment, the description of the client portion p1c is unnecessary in the payload portion p1 of the ticket. Accordingly, the workload regarding creation of a ticket may be reduced.

In the embodiments described above, the server device 10 is an example of an information processing apparatus. The user terminal 20 is an example of a terminal. The ticket is an example of data. The ticket receiving unit 11 is an example of a receiving unit. The server code execution unit 12 is an example of a code execution unit, a generating unit, and a transmitting unit. The device control unit 13 is an example of a control unit. The server code is an example of first code. The client code is an example of second code.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus configured to provide an application programming interface (API) group for controlling a device coupled via a network, the information processing apparatus comprising:
a memory; and
a processor coupled to the memory, the processor being configured to
execute a receiving process that includes receiving data from a terminal, the data including a first code for a definition on an API configured to access the device, the first code including a symbol of the API and a symbol of the device;
execute a code execution process that includes executing the first code included in the received data to cause the API indicated by the first code to be invocable from the terminal by associating the symbol of the API with the symbol of the device and a symbol of the information processing apparatus; and
execute a control process that includes performing, in response to an invocation request for the API from the terminal, control over the device by using the API.

2. The information processing apparatus according to claim 1,
wherein the data includes second code indicating processing to be executed by the terminal, and
wherein the control process includes, in response to an invocation request for the API specified in the first code, the invocation request being transmitted from the terminal when the terminal executes the second code, performing control in accordance with the API over the device.

3. The information processing apparatus according to claim 1, wherein the processor is further configured to
execute a generation process that includes generating, based on the data, information to be used for invoking, from the terminal, the API that is caused to be invocable from the terminal by execution of the first code, and
execute a transmitting process that includes transmitting the information to the terminal, and
wherein the control process includes executing, in response to an invocation request for the API specified in the first code, the invocation request being transmitted from the terminal based on the information, performing control in accordance with the API over the device.

4. An access control system, comprising:
an information processing apparatus configured to provide an API group for controlling a device coupled via a network; and
a terminal configured to be coupled to the information processing apparatus via a network, wherein the information processing apparatus includes
a memory, and
a processor being coupled to the memory, the processor being configured to execute a receiving process that includes receiving data from the terminal, the data including a first code for a definition on an API configured to access the device, the first code including a symbol of the API and a symbol of the device;
execute a code execution process that includes executing the first code included in the received data to cause the API indicated by the first code to be invocable from the terminal by associating the symbol of the API with the symbol of the device and a symbol of the information processing apparatus; and
execute a control process that includes performing, in response to an invocation request for the API from the terminal, control over the device by using the API.

5. The access control system according to claim 4, wherein the data includes second code indicating processing to be executed by the terminal, and
wherein the control process includes, in response to an invocation request for the API specified in the first code, the invocation request being transmitted from the terminal when the terminal executes the second code, performing control in accordance with the API over the device.

6. The access control system according to claim 4, wherein the processor is further configured to
execute a generation process that includes generating, based on the data, information to be used for invoking, from the terminal, the API that is caused to be invocable from the terminal by execution of the first code, and
execute a transmitting process that includes transmitting the information to the terminal, and
wherein the control process includes executing, in response to an invocation request for the API specified in the first code, the invocation request being transmitted from the terminal based on the information, performing control in accordance with the API over the device.

7. A non-transitory computer-readable storage medium for storing a access control program which causes a computer to perform processing, the computer being configured to provide an API group for controlling a device coupled via a network, the processing comprising:
executing a receiving process that includes receiving data from a terminal, the data including a first code for a definition on an API configured to access the device, the first code including a symbol of the API and a symbol of the device;
executing a code execution process that includes executing the first code included in the received data to cause the API indicated by the first code to be invocable from the terminal by associating the symbol of the API with the symbol of the device and a symbol of the information processing apparatus; and
executing a control process that includes performing, in response to an invocation request for the API from the terminal, over the device by using the API.

8. The non-transitory computer-readable storage medium according to claim 7,
wherein the data includes second code indicating processing to be executed by the terminal, and
wherein the control process includes, in response to an invocation request for the API specified in the first code, the invocation request being transmitted from the terminal when the terminal executes the second code, performing control in accordance with the API over the device.

9. The non-transitory computer-readable storage medium according to claim 7, the processing further comprising:
executing a generation process that includes generating, based on the data, information to be used for invoking, from the terminal, the API that is caused to be invocable from the terminal by execution of the first code; and
executing a transmitting process that includes transmitting the information to the terminal,
wherein the control process includes executing, in response to an invocation request for the API specified in the first code, the invocation request being transmitted from the terminal based on the information, performing control in accordance with the API over the device.

* * * * *